(12) United States Patent
Knapp, III

(10) Patent No.: US 7,013,408 B2
(45) Date of Patent: Mar. 14, 2006

(54) USER DEFINED DISK ARRAY

(75) Inventor: Henry H. Knapp, III, Centennial, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 480 days.

(21) Appl. No.: 10/214,082

(22) Filed: Aug. 6, 2002

(65) Prior Publication Data

US 2004/0030826 A1    Feb. 12, 2004

(51) Int. Cl.
*G06F 11/00* (2006.01)

(52) U.S. Cl. ............................. 714/7; 714/5
(58) Field of Classification Search ............ 714/5, 714/7, 41, 42
See application file for complete search history.

(56) References Cited

U.S. PATENT DOCUMENTS

| | | | | |
|---|---|---|---|---|
| 5,101,492 A | * | 3/1992 | Schultz et al. | 714/7 |
| 5,148,432 A | * | 9/1992 | Gordon et al. | 714/7 |
| 5,568,629 A | * | 10/1996 | Gentry et al. | 711/114 |
| 5,615,335 A | * | 3/1997 | Onffroy et al. | 714/30 |
| 5,854,942 A | * | 12/1998 | Penokie | 710/10 |
| 5,857,112 A | * | 1/1999 | Hashemi et al. | 710/8 |
| 6,425,049 B1 | * | 7/2002 | Yamamoto et al. | 711/112 |
| 6,557,123 B1 | * | 4/2003 | Wiencko et al. | 714/701 |

OTHER PUBLICATIONS eXpertise2Go.com "Introduction to Expert Systems", 2001, pp. 17-18.*

* cited by examiner

*Primary Examiner*—Robert Beausoliel
*Assistant Examiner*—Gabriel L. Chu
(74) *Attorney, Agent, or Firm*—Martine Penilla & Gencarella, LLP

(57) ABSTRACT

A method and system for automating the creation of a managed data storage system. Specifically the present invention describes an automated method for building, evaluating and repairing a managed set of disk storage devices utilizing a rule based expert system operating on a host computer. The system allocates available disks and controllers according to a predetermined size requirement and a set of rules. The set of rules designates a layout that provides optimum performance. The system also evaluates the layout by utilizing a set of rules to test reliability and comparative analysis to test performance. The system performs self-repairs in the event of a component failure and generates a notification of the failure and an analysis of the degradation of the system resulting from the failure so replacement components might be obtained.

33 Claims, 8 Drawing Sheets

USER DEFINED DISK ARRAY

BACKGROUND OF THE INVENTION

1. Field of the Invention

Embodiments of the present invention relate to the field of data storage systems. More particularly, embodiments of the present invention relate generally to the automatic allocation of disks in a data storage system to provide redundant, efficient and reliable storage.

2. Related Art

Secondary data storage is an integral part of large data processing systems. A typical data storage system in the past utilized a single, expensive magnetic disk for storing large amounts of data. This single disk in general is accessed by the Central Processing Unit (CPU) through a separate Direct Memory Access (DMA) controller. The DMA controller then translates and executes the Input/Output (I/O) requests of the CPU. For single disk memory storage systems, the speed of data transfer to and from the single, large disk is much slower than the processing speed of the CPU and acts as a data processing bottleneck.

In response, redundant arrays of independent disks (RAIDs) have evolved from the single disk storage systems in order to match the speed of secondary storage access with the increasingly faster processing speeds of the CPU. To increase system throughput, the RAID architecture of secondary storage allows for the concurrent access of data from multiple disk drives.

The concept for the RAID architecture was first formalized in an article written by some members of the Department of Electrical Engineering and Computer Sciences at the University of California at Berkeley, entitled: "A Case for Redundant Arrays of Inexpensive Disks (RAID)," by D. A. Patterson, G. Gibson, and R. H. Katz, ACM SIGMOD Conference, Chicago, Ill., June 1988, hereinafter referred to as "Patterson et al."

Typically, RAID architectures consist of one or more host interface controllers connected to several peripheral interface controllers via a high-speed data bus. Each peripheral interface controller is, in turn, connected to several individual disk drives, which provide the secondary storage for the connected hosts. Peripheral interface controllers, also referred to as array controllers herein, can be connected to the disk drives via common communication interfaces (e.g., SCSI). Generally, the speed of the data bus is greater than the speed of the interface between the disk drives and the peripheral interface controllers.

Some RAID storage systems contain spare disk drives. Storage units with additional spare disks are designed to operate continuously over a specified period of time, without requiring any repair of the unit due to failed disks. This is accomplished by carefully identifying and quantifying the components that are expected to fail during a given time period, and incorporating within the system sufficient hot-spare parts or disks. This internal spare disk architecture can automatically switch to the spare disks when a failure is encountered. Spares are incorporated so that compatible disk devices are always at hand upon a disk failure.

Prior Art FIG. 1 depicts a common implementation of a data storage system 100 containing spare disks. The data storage system is arranged in a mirrored configuration 105a & b–125a & b with three spares 130, 132 & 135. In the data storage system 100, a data volume is divided into segments called stripe units. Stripe units are mapped consecutively on a set of physical devices for parallel access purposes.

For example, data storage system 100 contains thirteen disks. Ten of the disks (e.g., disks 105a & b, 110a & b, 115a & b, 120a & b, and 125a & b) contain data and their redundancies. The remaining three disks (e.g., disks 130, 132 and 135) are spare disks.

Further, system 100 stripes its data across groups of data strips. In the redundancy group of stripe 150a, disk 105a contains strip 101a, disk 110a contains strip 102a, disk 115a contains strip 103a, disk 120a contains strip 104a and disk 125a contains strip 107a. Mirrored stripe 150b contains mirrored strips, e.g. strip 107b that mirrors 107a.

A disadvantage of the redundant disk storage array is that it is configured by a system administrator who has the daunting task of building the system. This requires knowing every component in the system and creating the system so that it performs well, is reliable and never loses data. If a component fails and must be replaced, it becomes necessary to reconfigure the system, requiring numerous manipulations in order to have the system working again.

In order to build the system, the System Administrator needs to issue many commands, interfacing through a plethora of graphical user interface (GUI) panels to define the disks to be used and to assure that the controllers are different for mirrored disks. He has to define the areas on the disks that will be strung together to define the stripes, and keep track of the configuration. Within the configuration, disks can be mirrored, or spare portions can be spread over a group of disks, or both. If spread out over the array of disks, there are many RAID configurations, depending on how many disks in a group and the amount of redundant storage allocated. All these different configurations require complex and technical settings and parameters to be formulated by the system administrator and programmed into the system using, often times, cumbersome programming tools. All this needs to be done so as to be able to write a maximum amount of data in a minimum amount of time, efficiently and with reliability that if any piece fails, data will not be lost.

The system administrator also has to create hot spare pools in order to have sufficient spare components available to replace failed components. He has to track failures and project future failures in order to keep the spare pools sufficiently populated.

SUMMARY OF THE INVENTION

Accordingly, a need exists for a method and system for reducing the burden on the System Administrator by automating the process of disk allocation and management in a data storage system.

Specifically, one embodiment of the present invention provides an automated method and system for disk allocation in a data storage system. The method encompasses automatically creating a managed data storage system from available disk drives and controllers, evaluating the managed data storage system, reporting results of the evaluation, and repairing detected failures as needed.

The automated creation of a managed data storage system as described above may be responsive to a function call defining a list of available of disk drives and a requested storage size. The automated method as described may also be in response to a function call defining requested storage size, wherein the available disk drives and controllers would then be assessed.

The method for creating and evaluating the managed data storage system may employ a Rule-Based Expert System. The method employs a builder to create a managed data storage system containing a set of disks and controllers configured as mirrored stripes with each side of a mirrored set of disks coupled to a different controller. The mirrored stripes are populated by as many disks as are available. Basically, the builder takes a collection of components and makes a composite device therefrom.

The method for evaluating the managed data storage system includes using an evaluator to fail single components in succession and assessing results. The evaluator can be operated on a system constructed using the builder. The automated method further includes failing components in pairs and assessing results. The automated method for repairing detected failures encompasses replacing a failed component with an allocated spare component, generating a notification of replacement and an inventory of remaining replacement components. This can be performed using an immune system.

More specifically, an embodiment of the present invention includes a system that contains a builder for automatically configuring a redundant array of storage resources into a storage system, using an available set of resources. The configuration is based on a user parameter set and based on a set of rules. The system also contains an evaluator for automatically evaluating a configuration of the storage system as generated by the builder. The evaluator simulates a response of the configuration to a plurality of failures and generates a report based thereon. Also contained in the system is a fault reaction system for allowing a user to define a prescribed action to take place upon a failure in the storage system.

Further embodiments include the above and wherein the storage resources comprise a plurality of disk drives and a plurality of controllers and wherein the set of rules of the builder comprise: placing different sides of a mirror pair on different controllers of the configuration; maximizing the use of available controllers in the configuration; maximizing the number of available disks used in a stripe; using an optimum number of spare disks based on a total number of disks of the configuration as determined by a mean time of failure; and based on a required storage parameter, determining the total number of disks required for the configuration.

Further embodiments include the above and wherein the plurality of failures of the evaluator comprise: failing every component individually of the configuration; failing every pair of components individually of the configuration; and failing a controller of the configuration.

These and other advantages of the present invention will become obvious to those of ordinary skill in the art after having read the following detailed description of the preferred embodiments that are illustrated in the accompanying drawings.

BRIEF DESCRIPTION OF THE DRAWINGS

The accompanying drawings, which are incorporated in and form a part of this specification, illustrate embodiments of the invention and, together with the description, serve to explain the principles of the invention.

PRIOR ART

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic information capable of being stored, transferred, combined, compared, and otherwise manipulated in a computer system. It has proven convenient at times, principally for reasons of common usage, to refer to these information as transactions, bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "building," "creating," "transmitting," "receiving," "evaluating," "repairing," "reporting," "partitioning," "generating," or the like, refer to actions and processes of a computer system or similar electronic computing device. The computer system or similar electronic computing device manipulates and transforms data represented as physical (electronic) quantities within the computer system memories, registers or other such information storage, transmission or display devices.

Figure 1:
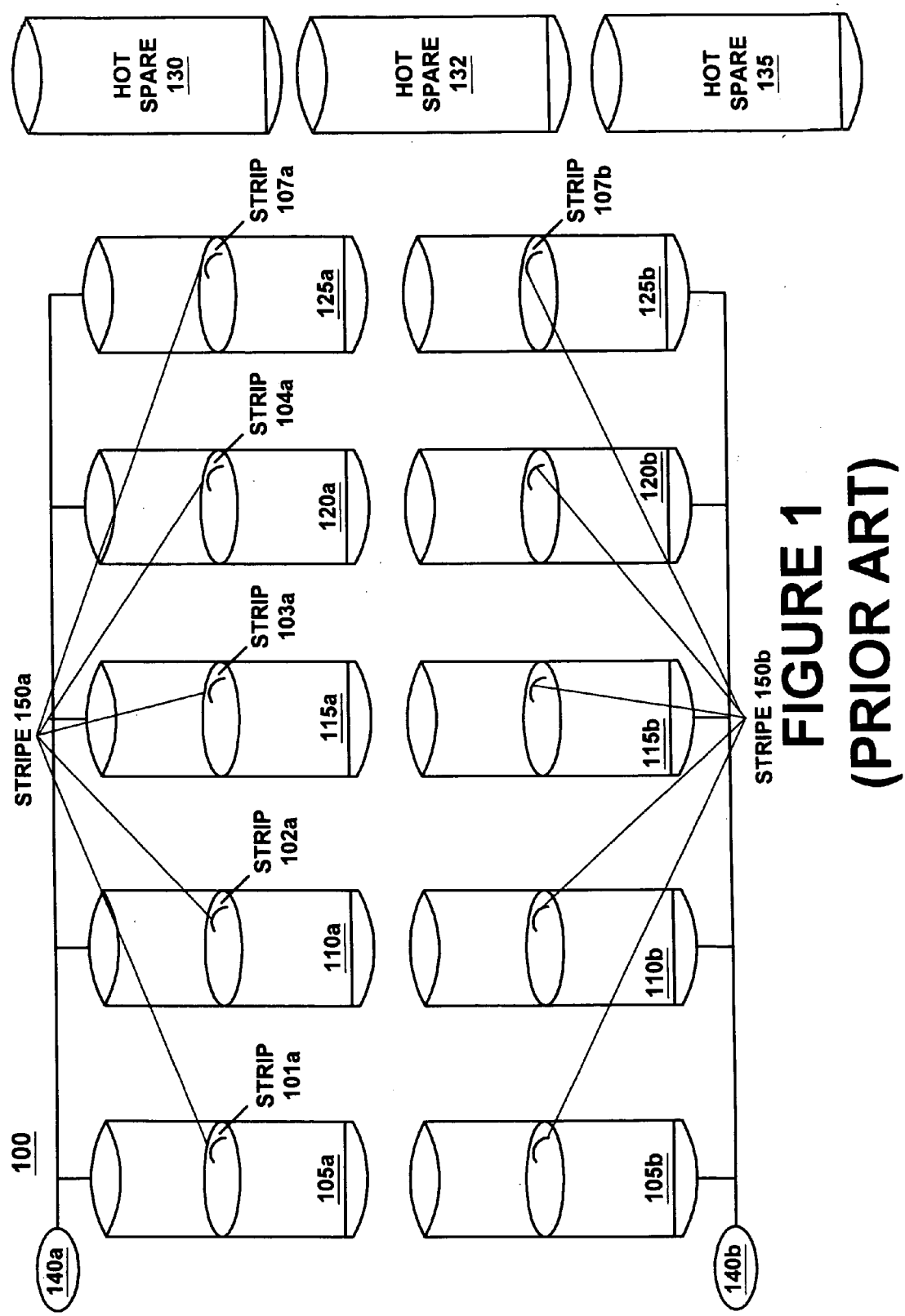
FIG. 1 is a block diagram of a data storage system in a redundant array of independent disks (RAID) in a striped mirror arrangement.
Figure 2:
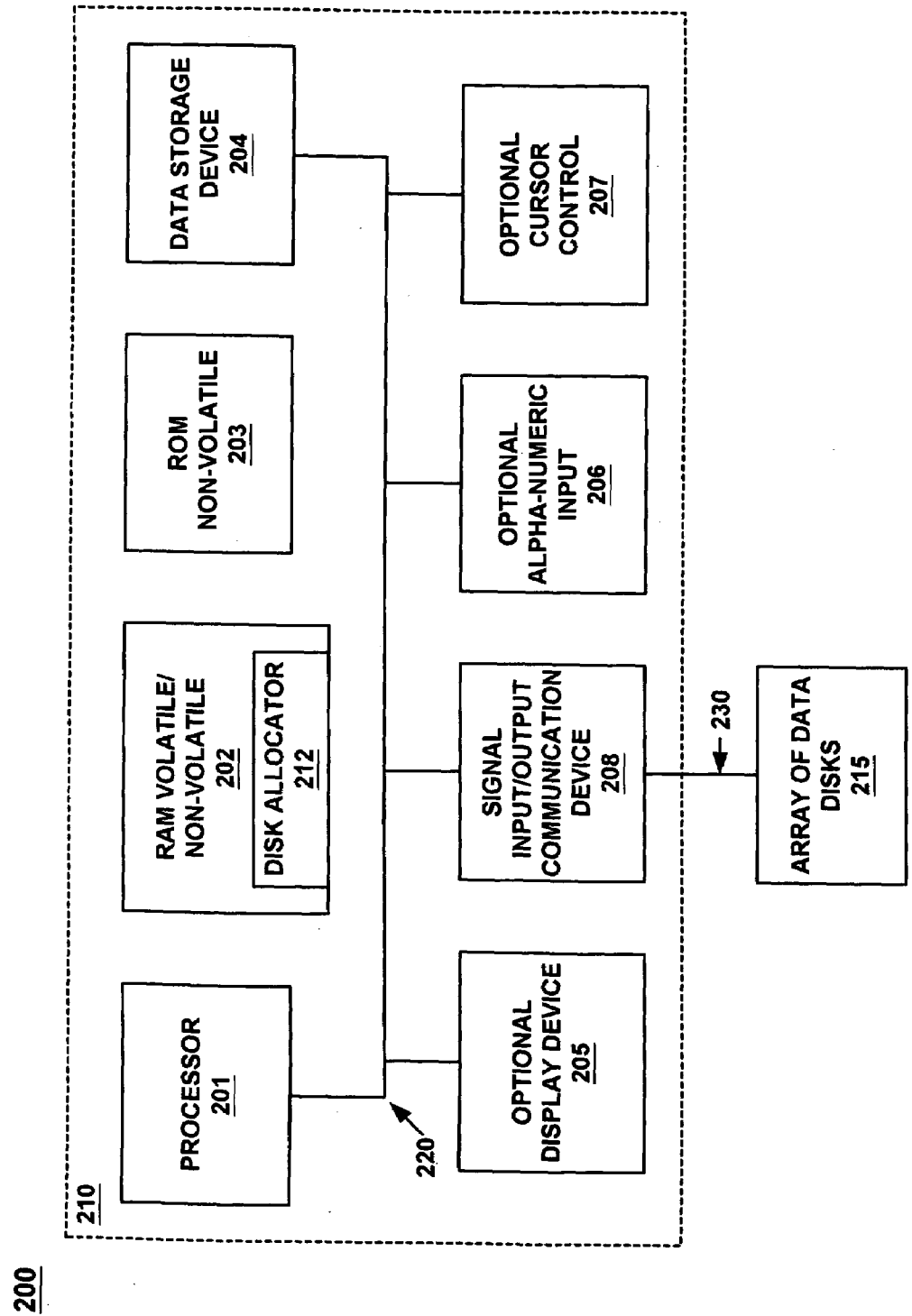
FIG. 2 is a logical block diagram of an exemplary host computer upon which an embodiment of the present invention may be practiced.

Referring to FIG. 2, embodiments of the present invention are comprised of computer-readable and computer-executable instructions that reside, for example, in computer-readable media of an electronic system, such as an a host computer system. FIG. 2 is a block diagram of exemplary embedded components of a host computer system 210 upon which embodiments of the present invention may be implemented. Exemplary host computer system 210 includes an internal address/data bus 220 for communicating information, a central processor 201 coupled with the bus 220 for processing information and instructions, a volatile memory 202 (e.g., random access memory (RAM), static RAM dynamic RAM, etc.) coupled with the bus 220 for storing information and instructions for the central processor 201, such as instructions for disk storage allocator 212, and a non-volatile memory 203 (e.g., read only memory (ROM), programmable ROM, flash memory, EPROM, EEPROM, etc.) coupled to the bus 220 for storing static information and instructions for the processor 201.

With reference still to FIG. 2, an optional signal Input/Output (I/O) device 208 is shown. The I/O device 208 is coupled to bus 220 for providing a communication link between host computer system 210 and an array network of data storage devices, such as disks. As such, signal I/O device 208 enables the central processor unit 201 to communicate with or monitor other electronic systems blocks that are coupled to the host computer system 210. In one embodiment of the present invention, the input and output device 208 is a serial communication port, but could also be any number of well known communication standards and protocols, e.g., Universal Serial Bus (USB), Ethernet, FireWire (IEEE 1394), parallel, small computer system interface (SCSI), infrared (IR) communication, Bluetooth wireless communication, etc. Instructions and data from the host computer system 210 travel through the port and onto an external bus 230 that provides for data transfer between components of the data storage system 200, including between redundant disk storage allocator 205, processor 201 and an array of disk drives 215.

Optionally, computer system 200 can include a display device 205 that is coupled to bus 220 for displaying graphics and/or video. Furthermore, system 200 can include an optional alphanumeric input device 206 including alphanumeric and function keys coupled to the bus 220 for communicating information and command selections to the central processor 201. Additionally, the computing device 200 of FIG. 2 can include an optional cursor control device 207 coupled to the bus 220 for communicating user information and command selections to the central processor 201.

Figure 3A:
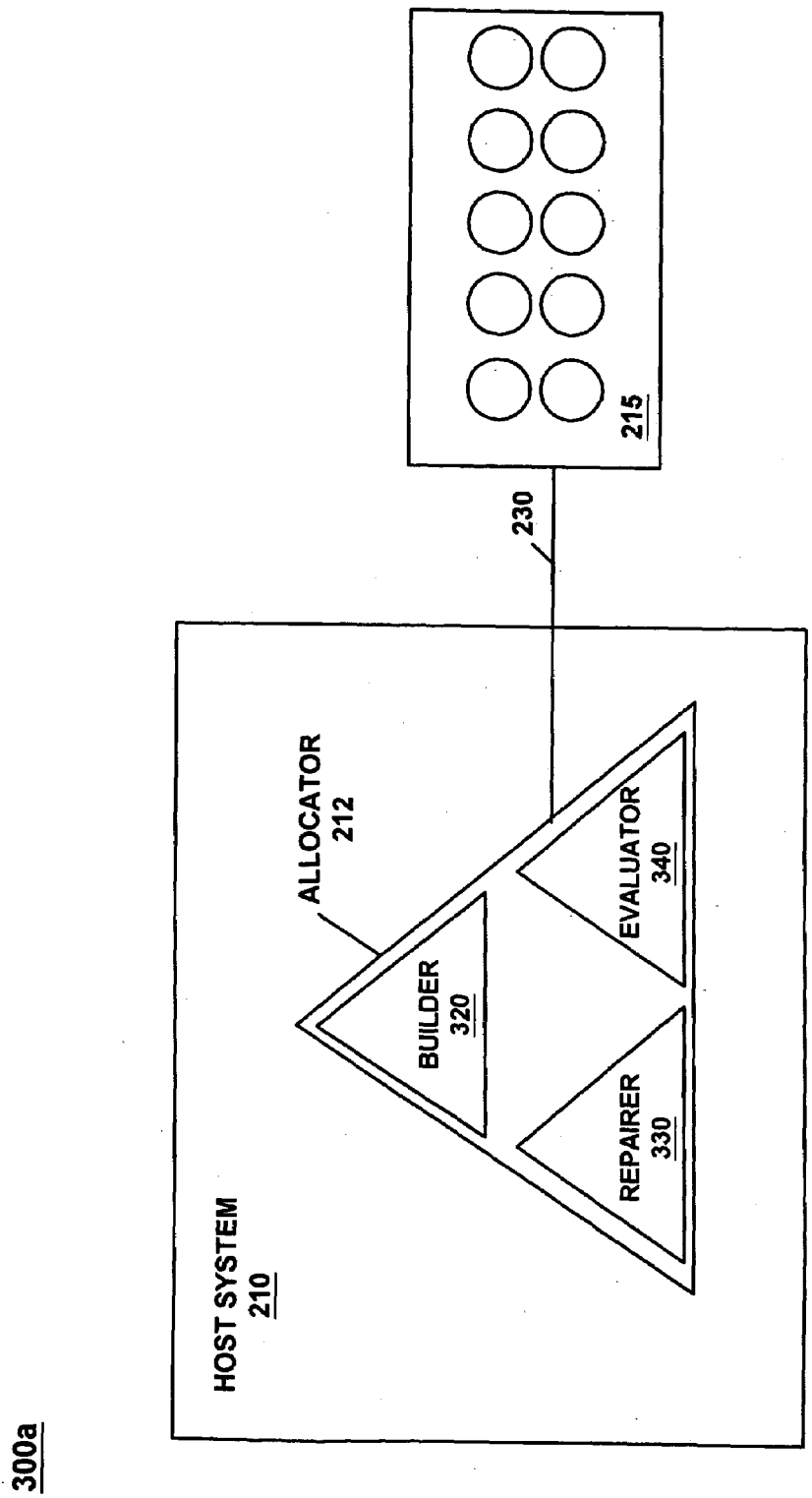
FIG. 3A is a block diagram illustrating exemplary architecture of a redundant disk storage allocator in accordance with an embodiment of the present invention.

FIG. 3A is a block diagram illustrating an exemplary architecture 300a of a redundant disk storage allocator in accordance with an embodiment of the present invention. Redundant disk storage allocator 212, resident on host computer system 210, interfaces with the array of data disks 215 via data bus 230 and a signal I/O device (e.g., signal I/O communication device 208 of FIG. 2), according to one embodiment of the present invention. Allocator 212 comprises three major modules, according to one embodiment. These modules are builder module 320, repairer module 330 and evaluator module 340. These modules are discussed below, according to one embodiment, in conjunction with FIGS. 3B, 4, 5, 6 & 7.

FIGS. 3B, 4, 5, 6 & 7 below are flow diagrams of computer-implemented processes for creating, evaluating, and repairing a managed data storage system in accordance with embodiments of the present invention. These flow diagrams 300b, 400, 500, 600 and 700 include processes of the present invention which, in various embodiments, are carried out by a processor and electrical components under the control of computer readable and computer executable instructions. The computer readable and computer executable instructions may reside, for example, in data storage features such as volatile memory 202 and/or non-volatile memory 202 or 203 of FIG. 2. However, the computer readable and computer executable instructions may reside in any type of readable storage medium. Although specific steps are disclosed in flow diagrams 300b–700, such steps are exemplary. That is, the present invention is well suited to performing various other steps or variations of the steps recited in FIGS. 3B, 4, 5, 6 & 7. Within the present embodiment, it should be appreciated that the steps of flow diagrams 300b–700 may be performed by software, by hardware or by any combination of software and hardware.

Figure 3B:
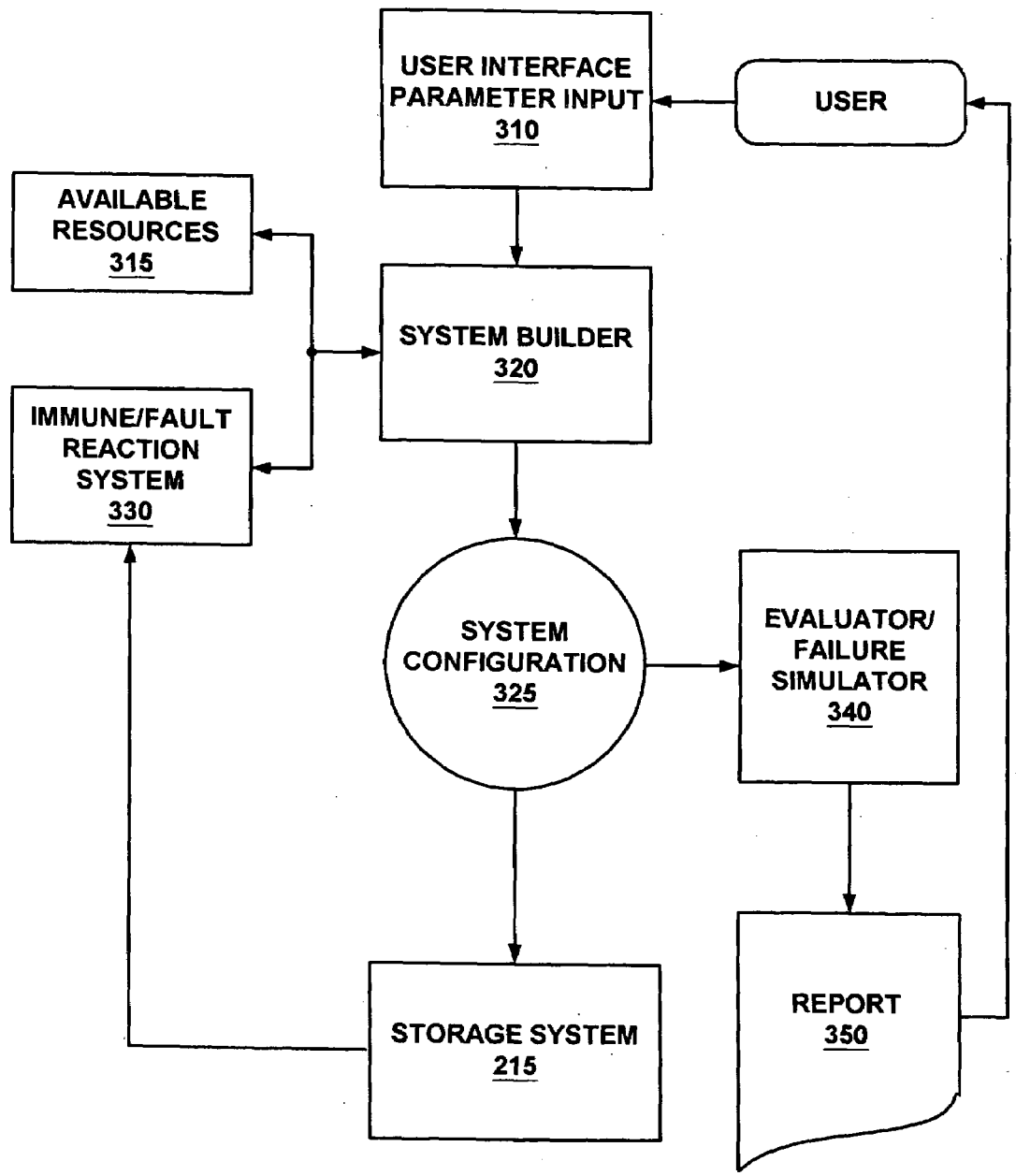
FIG. 3B is a data flow diagram illustrating a system for automatically configuring a redundant array of storage resources into a storage system, evaluating the storage system and prescribing action(s) to be taken in response to failure(s) in accordance with an embodiment of the present invention.

FIG. 3B is a data flow diagram 300b illustrating a system for automatically configuring a redundant array of storage resources into a storage system, evaluating the storage system and prescribing action(s) to be taken in response to failure(s) in accordance with an embodiment of the present invention. User Interface Parameter Input 310 inputs parameters to a System Builder 320. These parameters define a data Storage System 215 to be built and may include a name of the set of disks to be built or modified or may include a list of available disks from which to build or modify the storage system. According to one embodiment the input parameters might contain the name of a device to be built and a size in bytes to be made available. There are a wide variety of input parameters that may be used, in addition to those aforementioned, to specify the storage system to be built.

System Builder 320, a Rule Based Expert System (RBES) software module, assesses Available Resources 315 and, using input parameters from User Interface Parameter Input 310 and a set of rules, generates a System Configuration 325. The Available Resources 315 may include a number and, possibly a variety, of disk drives and controllers. The rules used by the RBES may include such possibilities as; placing different sides of a mirror pair on different controllers of System Configuration 325, maximizing the use of available controllers in System Configuration 325, maximizing the number of available disks used in a stripe, using an optimum number of spare disks based on a total number of disks of System Configuration 325 as determined by a mean time between failures and, based on a required storage parameter, determining the total number of disks required for System Configuration 325. These rules are exemplary and should not be construed as limiting.

Once System Configuration 325 is defined, an evaluation is performed by an Evaluator/Failure Simulator 340. Evaluator 340 may be a software module or a set of software modules employing, according to one embodiment, a RBES. Evaluator 340 simulates failures according to the RBES rules such as, for example; failing every component of System Configuration 325 individually, failing every pair of components individually, and/or failing a controller of System Configuration 325. Such rules are exemplary and should not be construed as limiting. There are a variety of rules that may be employed for evaluating a system configuration. Evaluator 340 simulates a response to the simulated failures and generates a Report 350. Report 350 may contain assorted relevant information, including, according to one embodiment, an indication as to whether or not data would be lost in response to any failure or combination of failures.

A User, such as a System Administrator charged with the task of building a data storage system, decides, according to one embodiment, based on the report from step 350, whether System Configuration 325 is adequate. If so, in accordance with one embodiment, he requests via User Interface 310 that Builder 320 build Storage System 215 as configured. In accordance with one embodiment, if System Configuration 325 is not adequate, input parameters are modified and a new System Configuration 325 is generated and so forth until a satisfactory configuration is defined at which time Builder 320 is requested to build Storage System 215.

Once Storage System 215 is built, Immune/Fault Reaction System 330 (e.g., Repairer 330 of FIG. 3A) monitors Storage System 215 and, if a failure is detected, responds according to user-prescribed actions. Such user-prescribed actions may, according to one embodiment, include automatically replacing a failed disk with a hot spare. User prescribed actions may, in accordance with an embodiment, include notifying a System Administrator of a failure, via a predefined mode, so that the System Administrator might take action.

Figure 4:
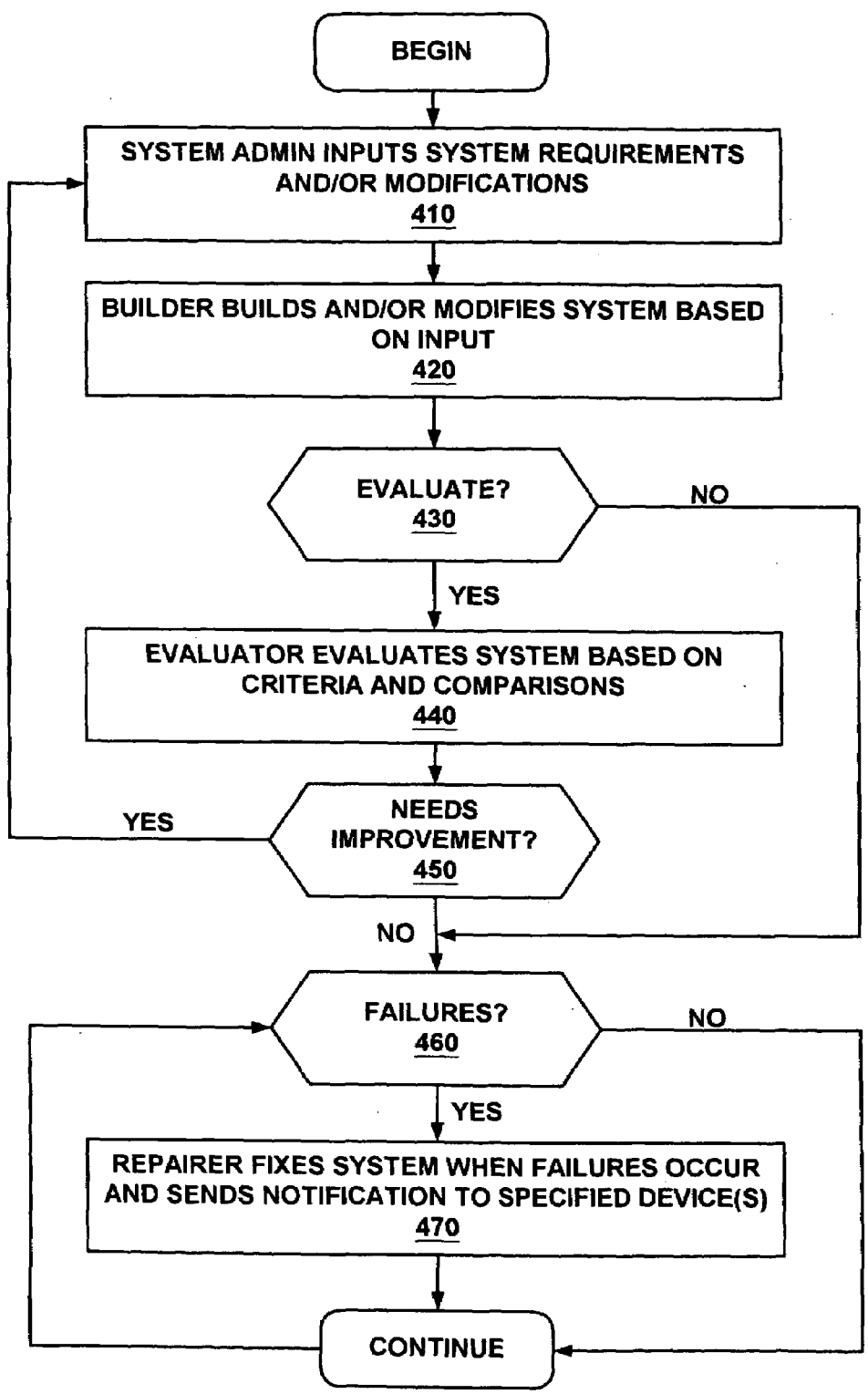
FIG. 4 is a flow diagram of a computer-implemented process for managing a data storage system in accordance with an embodiment of the present invention.

FIG. 4 is a flow diagram 400 of a computer-implemented process for managing a data storage system in accordance with an embodiment of the present invention. The data storage system is made up of a collection of disks managed by a Solaris™ Volume Manager (SVM) as provided by Sun Microsystems, and the storage system's base configuration is designed to correspond to the heap portion of random access memory. In step 410, according to one embodiment, the process begins when a System Administrator or a qualified user uses a user interface to input a command or commands defining a data storage system to be built or modified. The command might contain, according to one embodiment, the name of the set of disks to be built or modified and a list of the disks from which to build or modify the set. According to one embodiment, the command might contain the name of the device to be built and a size in bytes, and the builder (e.g., builder 320 of FIG. 3) portion of the allocator (e.g., allocator 212 of FIG. 3) assesses the available hardware for building the device. The builder 320 then, as illustrated in step 420, builds or modifies the system using a rule-based expert system based on the input values received and a set of rules. The process may then move to the evaluation phase if indicated, as shown by step 430, or the process might end with the built system, provided no failures have occurred. If an evaluation is not indicated, the process proceeds to step 460 and checks for failures.

At step 440 of FIG. 4, according to one embodiment of the present invention, the evaluator (e.g., evaluator 340 of FIG. 3) portion of allocator 212 evaluates the system's reliability. The evaluation occurs in response to a command, based on applying a set of rules. The set of structured rules, generally, calls for failing components of the data storage system, both singly and in pairs, and assessing the results. The evaluator may also be employed, according to one embodiment, independent of the builder and repairer. That is, evaluator 340 may be employed to evaluate an existing data storage system. The evaluation is performed, according to one embodiment, utilizing a rule-based expert system. Following the evaluation, the evaluator may issue a report containing the results of the evaluation.

According to one embodiment, if the evaluation results indicate a need for improvement, as shown in step 450, the process moves to step 410 so that the System Administrator may modify the input requirements accordingly and call on builder 320 to modify the data storage system. If no improvement is needed, the allocator monitors the data storage system for failures, as illustrated by step 460. If no failures are detected, the allocator continues to monitor the system.

At step 470 of FIG. 4, according to one embodiment, allocator 212 detects a failure of one or more components in the system and calls on the repairer (e.g., repairer 330 of FIG. 3). Repairer 330 may, in one embodiment, incorporate a method such as described in the following co-pending U.S. patent application assigned to the present assignee, Ser. No. 09/955,527, entitled "METHOD AND SYSTEM FOR LEVERAGING SPARES IN A DATA STORAGE SYSTEM INCLUDING A PLURALITY OF DISK DRIVES," by Ebrahim Hashemi, the disclosure of which is hereby incorporated by reference. Repairer 330 repairs the system by substituting a spare component for the failed component and sends notification to one or more designated devices, as illustrated by step 470. The notification might be, according to various embodiments, a log generated at a system log printer, an e-mail message to a System Administrator's personal computer or PDA, a call to a System Administrator's phone, a message to a pager, an icon on a system manager console that becomes a display that highlights the failure. The notification might also be a combination of any of the foregoing or of any other message medium that would serve to notify a System Administrator that the reliability of the system is becoming degraded so that replacement spares might be added back to the system to restore its original degree of reliability.

Figure 5:
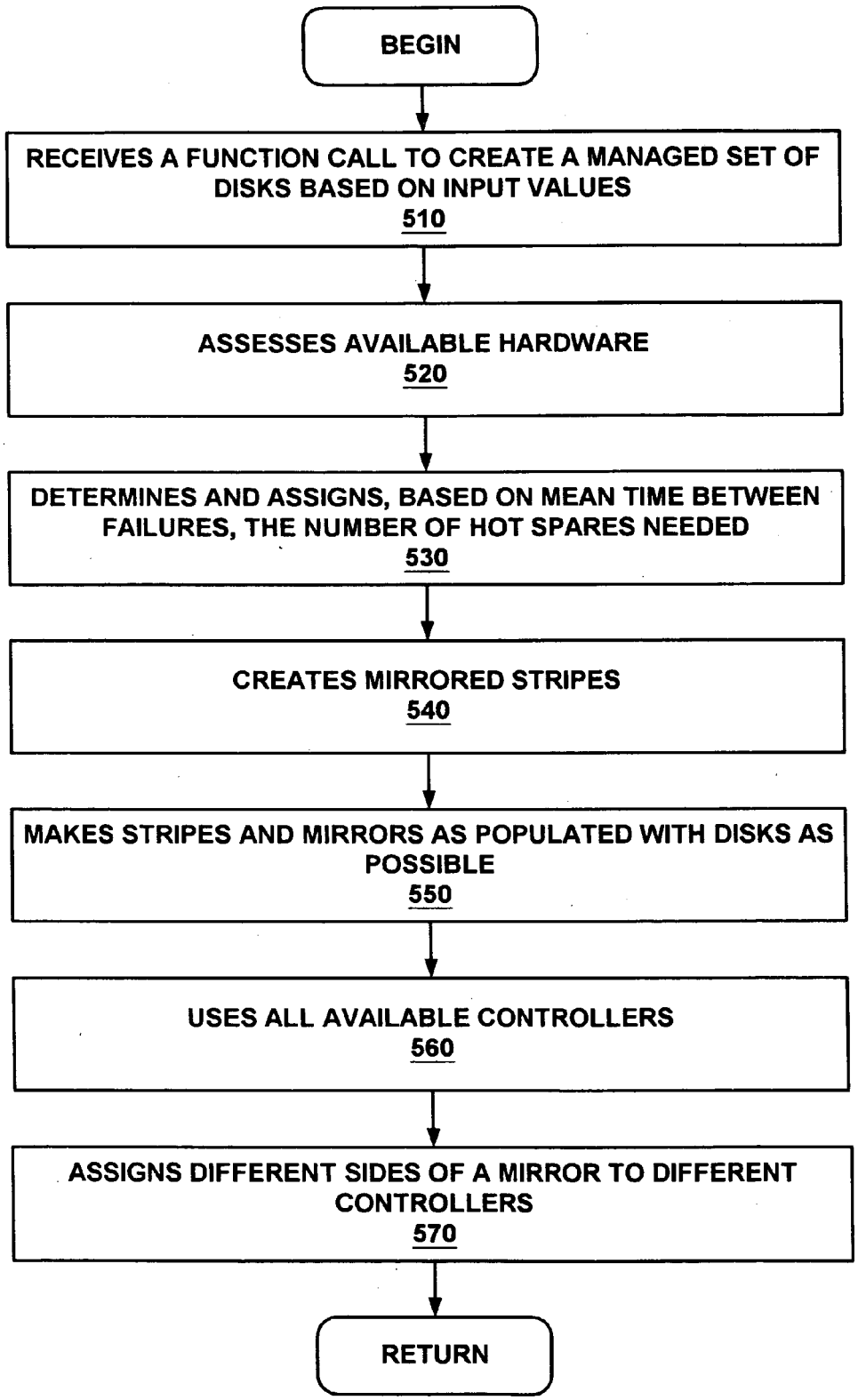
FIG. 5 is a flow diagram of steps for automating the building of a managed set of disks in accordance with an embodiment of the present invention.

FIG. 5 is a flow diagram 500 of steps for automating the building or modification of a managed set of disks in accordance with an embodiment of the present invention. In step 510, the allocator receives a function call requesting that it build or modify a managed set of disks based on input values. The input values may include, but are not limited to, those described in the following paragraphs and associated tables.

Table 1 below illustrates one example of pseudo code that may be used in a Solaris™ operating environment as provided by Sun Microsystems for creating a managed set of disks named set_name that manages the set of disks listed in disk_list, or adds the set of disks listed in disk_list to the set of disks already managed in the set named set_name.

TABLE 1 int result svm_manage_disks(char *set_name, char *disk_list[ ]);

Table 2 below illustrates one example of pseudo code that may be used in a Solaris™ operating environment as provided by Sun Microsystems for allocating a size, in bytes, from the managed set named set_name and returning a reference to the device to which the space was allocated in ★device_name.

TABLE 2

Int result svm_alloc(char *set_name uint64_t size_in_bytes,char **device_namep);

Table 3 below illustrates one example of pseudo code that may be used in a Solaris™ operating environment as provided by Sun Microsystems for changing the amount of space allocated to device_name in set_name to size_in_bytes.

TABLE 3 int result svm_realloc(char *set_name, char *device_name, uint64_t size_in_bytes;

Table 4 below illustrates one example of pseudo code that may be used in a Solaris™ operating environment as provided by Sun Microsystems for freeing the amount of space allocated to device_name in set_name.

TABLE 4 int result svm_free(char *set_name, char *device_name) ;

According to one embodiment, the builder (e.g., builder 320 of FIG. 3) portion of the allocator (e.g., allocator 212 of FIG. 3) assesses available hardware as illustrated in step 520 of FIG. 5 for building the managed set of disks. An ideal collection of hardware contains disks of identical type and size, but collections of disks of varying sizes may be used. Builder 320 uses the Solaris™ format utility to divide each disk that it manages into partitions. If a collection contains disks of varying sizes, builder 320 makes all partitions the same size even though doing so may not fully utilize the available space on the larger disks. This arrangement enables any disk to replace any other disk in the configuration should the other disk fail.

Some of the disks in the collection are used as hot spares. In one embodiment the allocator may use partitions of disk space as hot spares. The software automatically replaces failed disks with hot spare disks. As illustrated in step 530, Builder 320 calculates the number of hot spare disks needed to ensure that a hot spare disk is available whenever a disk used to store data fails. In one embodiment, it bases its calculation on the percent availability it determines is feasible (using "mean time between failures" data) for the set of disks it is building. An odd number of disks is always reserved as hot spares, leaving an even number of disks for data storage.

Step 540 illustrates the creating of mirrored stripes according to one embodiment of the present invention. Following a set of provided rules, the builder combines the data storage slices into a single striped and mirrored volume. The slices are arranged in the volume to provide the maximum redundancy possible in the collection of disks that allocator 212 is managing. This may be accomplished, as illustrated by step 550, by making the stripes and mirrors as populated with disks as possible. This may follow a rule for using all the available disks. The striped mirror configuration is believed to provide the best performance and reliability for separate disk drives.

At step 560, according to one embodiment, another rule may be followed which is to use all available controllers. This would also add to the reliability of the storage system device being built. Step 570 illustrates another rule that may be followed, which is to assign different sides of a mirror to different controllers. This assures redundancy in the case a controller should fail.

Steps 510 through 570 have provided an example of the steps that may be taken and rules that may be imposed in a rule-based expert system for building a single volume managed disk storage system according to one embodiment of the present invention. It should be understood that although specific steps are disclosed in flow diagram 500, such steps are exemplary. That is, the present invention is well suited to performing various other steps or variations of the steps recited in FIG. 5.

Figure 6:
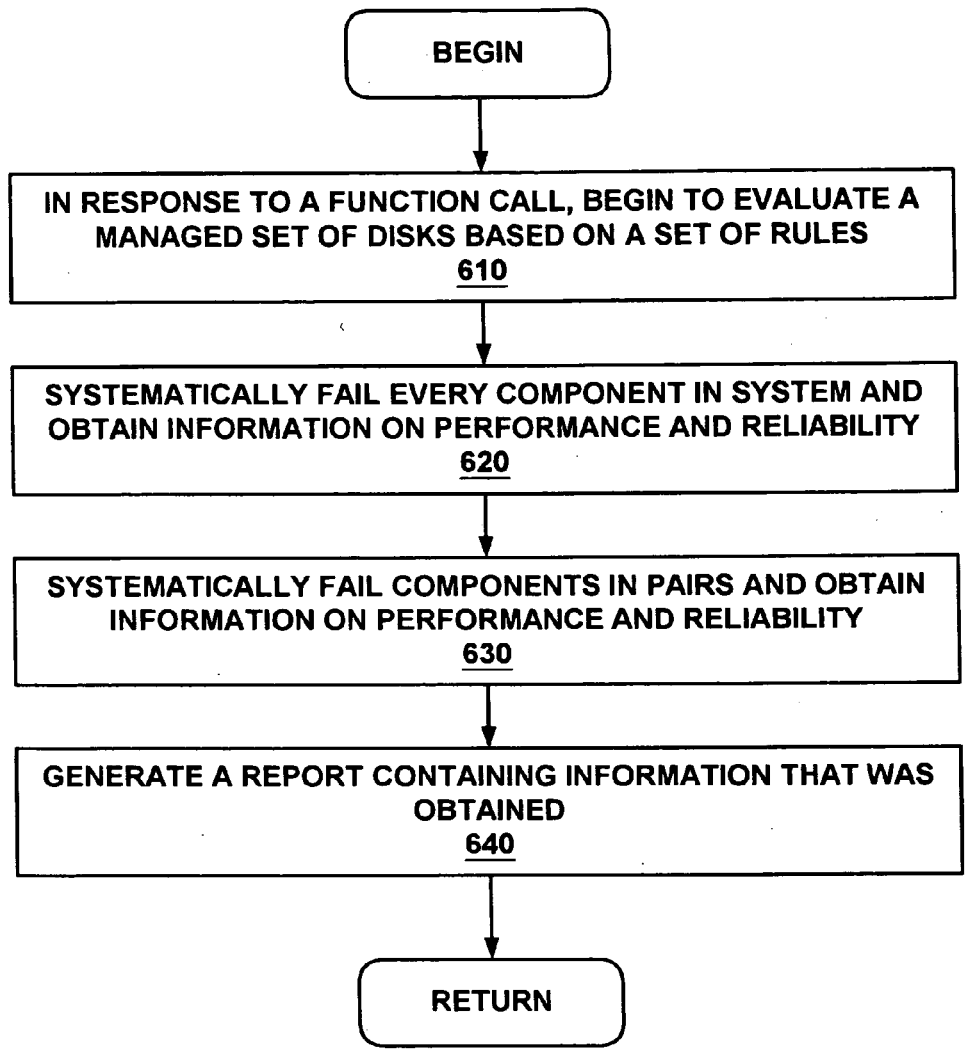
FIG. 6 is a flow diagram of steps for automating the evaluating of a managed set disks according to one embodiment of the present invention.

FIG. 6 is a flow diagram 600 of steps for automating the evaluating of a managed set disks according to one embodiment of the present invention. This step may be performed by an evaluator (e.g., evaluator 340 of FIG. 3) portion of allocator 212. The evaluator would respond to a function call, as illustrated by step 610 of FIG. 6, requesting the evaluation of a set or volume of managed disk storage. The managed disk storage to be evaluated may be a newly built set, a newly modified set or an existing set for which an evaluation is desired. The evaluation may, according to one embodiment of the present invention, be based on a rule-based expert system.

Step 620 illustrates one rule that evaluator 340 may follow in evaluating a managed disk storage system, according to one embodiment. In this step, evaluator 340 systematically fails every component of the system, singly, and obtains information on performance and reliability (e.g., has data been lost?).

Step 630 illustrates a subsequent rule that evaluator 340 may follow in the evaluation process. In step 630 the evaluator systematically fails components in predetermined pairs and obtains information on performance and reliability.

At step 640 the evaluator generates a report containing the information obtained in steps 620 and 630 of the evaluation process. It should be understood that although specific steps are disclosed in flow diagram 600, such steps are exemplary. That is, the present invention is well suited to performing various other steps or variations of the steps recited in FIG. 6.

Figure 7:
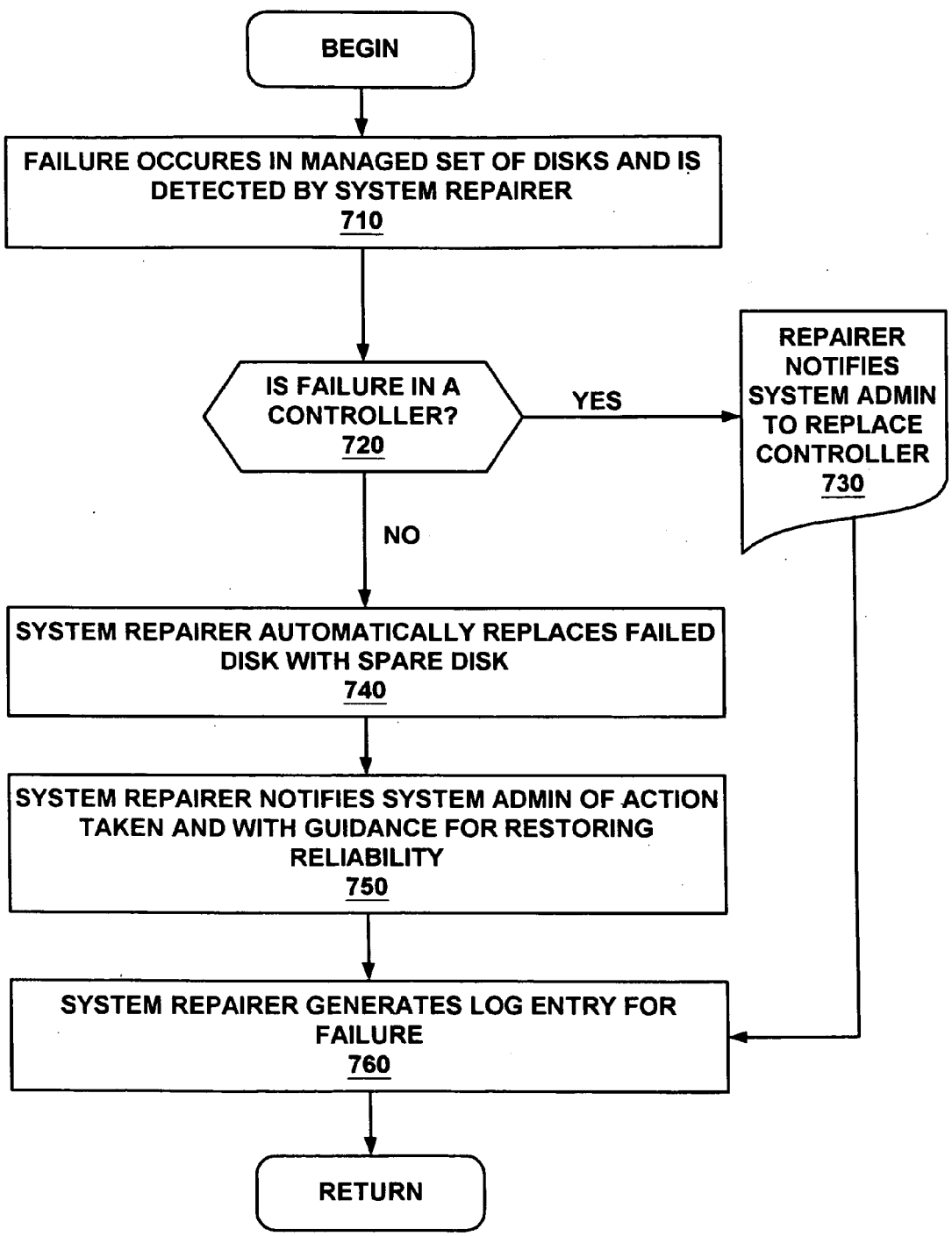
FIG. 7 is a flow diagram of a computer-implemented method for repairing a managed set of disks according to one embodiment of the present invention.

FIG. 7 is a flow diagram 700 of a computer-implemented method for repairing a managed set of disks according to one embodiment of the present invention. The system repairer (e.g., repairer 330 of FIG. 3) portion of allocator 212 monitors the managed set of disks according to one embodiment of the present invention. Step 710 of FIG. 7 illustrates repairer 330 detecting a failure in the managed set of disks. According to one embodiment, as shown in step 720, repairer 330 checks to see if the failure has occurred in a controller. If so, the repairer sends notification to the System Administrator's console and/or to a designated device such as a pager, a cell phone or a personal computer, advising of the failure and the need to replace the controller. In one embodiment, the system may be configured to have spare controllers and to automatically repair the system by substituting a spare controller for the one that has failed. The process then proceeds to step 760, according to one embodiment, and generates a log entry for the failure.

In step 740, if the failure was not determined to be a controller, it may be assumed to be a disk failure, according to one embodiment. The system may automatically replace a failed disk with one of the hot spare disks, employing a method such as described in co-pending U.S. patent application assigned to the present assignee, Ser. No. 09/955,527, entitled "METHOD AND SYSTEM FOR LEVERAGING SPARES IN A DATA STORAGE SYSTEM INCLUDING A PLURALITY OF DISK DRIVES," by Ebrahim Hashemi, as disclosed above.

Having replaced a disk, according to one embodiment, the system repairer 330 notifies the System Administrator of the action taken as illustrated in step 750 of FIG. 7. The notification may include guidance for restoring the system to its original degree of reliability. This guidance may include instructions for replacing a particular spare disk or disks.

The repairer then may proceed to step 760 of FIG. 7 and generate a log entry for the failure that occurred, thus ending the response to the failure. The process then returns to a monitoring mode and flow diagram 700 is exited.

The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An automated method for disk allocation in a data storage system, said method comprising:
   a) based on accessed user parameters, automatically creating a managed data storage system from an available plurality of disk drives and controllers;
   b) evaluating said managed data storage system;
   c) reporting results of said evaluating; and
   d) repairing detected failures in said managed data storage system as needed;
   wherein said evaluating comprises failing single components in succession and assessing respective results.

2. The automated method as described in claim 1 wherein said a) is in response to a function call, said function call defining a list of said available plurality of disk drives and a requested storage size.

3. The automated method as described in claim 1 wherein said a) is in response to a function call, said function call defining requested storage size, wherein said available plurality of disk drives and controllers is then assessed.

4. The automated method as described in claim 1 wherein said managed data storage system comprises a plurality of disks and controllers, said plurality configured as mirrored stripes.

5. The automated method as described in claim 4 wherein the sides of a mirrored set of said plurality of disks are coupled to different instances of said plurality of controllers.

6. The automated method as described in claim 4 wherein said mirrored stripes are populated by as many of said plurality of disks as are available.

7. The automated method as described in claim 1 wherein said a) and said b) employ a Rule Based Expert System.

8. The automated method of claim 1 wherein said evaluating further comprises failing components in pairs and assessing respective results.

9. The automated method as described in claim 1 wherein said repairing detected failures comprises replacing a failed component with an allocated spare component.

10. The automated method of claim 9 further comprising generating a notification of replacement.

11. The automated method as described in claim 10 wherein said notification further comprises an inventory of remaining replacement components.

12. A data storage allocation system comprising:
    a host computer implementing a Rule-Based Expert System (RBES), wherein said RBES is for automatically building, modifying and evaluating the performance and reliability of a managed set of disks; and
    a user interface communicatively coupled to said host computer and for instructing said host computer and generating a plurality of responses during a method of automating disk allocation in said data storage allocation system, said method comprising:
    a) based on accessed user parameters, automatically creating a managed data storage system from available disk drives and controllers;
    b) evaluating said managed data storage system;
    c) reporting results of said evaluating; and
    d) repairing detected failures in said managed data storage system;
    wherein said evaluating comprises failing single components in succession and assessing respective results.

13. A disk storage allocation system as described in claim 12 wherein said a) is in response to a function call, said function call defining a list of said available plurality of disk drives and a requested storage size.

14. The automated system as described in claim 12 wherein said a) is in response to a function call, said function call defining requested storage size, wherein said available plurality of disk drives and controllers is then assessed.

15. The automated system as described in claim 12 wherein said managed data storage system comprises a plurality of disks and controllers, said plurality configured as mirrored stripes.

16. The automated system of claim 12 wherein said evaluating further comprises failing components in pairs and assessing respective results.

17. The automated system as described in claim 12 wherein said repairing detected failures comprises replacing a failed component with an allocated spare component.

18. The automated system of claim 17 further comprising generating a notification of replacement.

19. The automated system as described in claim 18 wherein said notification further comprises an inventory of remaining replacement components.

20. In a computer-useable medium having computer-readable program code embodied therein, a computer-implemented method for automating disk allocation in a data storage system, said method comprising:
    a) based on accessed user parameters, automatically creating a managed data storage system from available disk drives and controllers;
    b) evaluating said managed data storage system;
    c) reporting results of said evaluating; and
    d) repairing detected failures in said managed data storage system;
    wherein said evaluating comprises failing single components in succession and assessing respective results.

21. A method as described in claim 20 wherein said a) is in response to a function call, said function call defining a list of said available plurality of disk drives and a requested storage size.

22. The method as described in claim 20 wherein said a) is in response to a function call, said function call defining requested storage size, wherein said available plurality of disk drives and controllers is then assessed.

23. The method as described in claim 20 wherein said managed data storage system comprises a plurality of disks and controllers, said plurality configured as mirrored stripes.

24. The method of claim 20 wherein said evaluating further comprises failing components in pairs and assessing respective results.

25. The method as described in claim 20 wherein said repairing detected failures comprises replacing a failed component with an allocated spare component.

26. The method of claim 25 further comprising generating a notification of replacement.

27. The method as described in claim 26 wherein said notification further comprises an inventory of remaining replacement components.

28. A system comprising:
a builder for automatically configuring a redundant array of storage resources into a storage system from an available set of resources based on a user parameter set and based on a set of rules;
an evaluator for automatically evaluating a configuration, of said storage system, generated by said builder, said evaluator simulating a response of said configuration to a plurality of failures and generating a report based thereon; and
a fault reaction system for allowing a user to define a prescribed action to take place upon a failure in said storage system.

29. A system as described in claim 28 wherein said builder and said evaluator are software modules implemented using a Rule Based Expert System (RBES).

30. A system as described in claim 28 wherein said storage resources comprise a plurality of disk drives and a plurality of controllers.

31. A system as described in claim 30 wherein said set of rules of said builder comprise:
placing different sides of a mirror pair on different controllers of said configuration;
maximizing the use of available controllers in said configuration;
maximizing the number of available disks used in a stripe;
using an optimum number of spare disks based on a total number of disks of said configuration as determined by a mean time between failures; and
based on a required storage parameter, determining the total number of disks required for said configuration.

32. A system as described in claim 30 wherein said plurality of failures of said evaluator comprise:
failing every component individually of said configuration;
failing every pair of components individually of said configuration; and
failing a controller of said configuration.

33. A system as described in claim 32 wherein said report comprises an indication of whether or not data was lost in response to any failure of said plurality of failures.

* * * * *